United States Patent
Parrella

(10) Patent No.: US 9,423,158 B2
(45) Date of Patent: Aug. 23, 2016

(54) SYSTEM AND METHOD OF MAXIMIZING HEAT TRANSFER AT THE BOTTOM OF A WELL USING HEAT CONDUCTIVE COMPONENTS AND A PREDICTIVE MODEL

(76) Inventor: Michael J. Parrella, Weston, CT (US)

( * ) Notice: Subject to any disclaimer, the term of this patent is extended or adjusted under 35 U.S.C. 154(b) by 0 days.

(21) Appl. No.: 12/462,657

(22) Filed: Aug. 5, 2009

(65) Prior Publication Data

US 2010/0276115 A1 Nov. 4, 2010

Related U.S. Application Data

(63) Continuation-in-part of application No. 12/456,434, filed on Jun. 15, 2009.

(60) Provisional application No. 61/137,956, filed on Aug. 5, 2008, provisional application No. 61/137,974, filed on Aug. 5, 2008, provisional application No. 61/137,955, filed on Aug. 5, 2008, provisional application No. 61/137,975, filed on Aug. 5, 2008.

(51) Int. Cl.
| | | |
|---|---|---|
| *F03G 7/00* | (2006.01) | |
| *F24J 3/08* | (2006.01) | |
| *F28F 13/00* | (2006.01) | |

(52) U.S. Cl.
CPC *F24J 3/086* (2013.01); *F24J 3/082* (2013.01); *F28F 2013/006* (2013.01); *Y02E 10/125* (2013.01); *Y02E 10/16* (2013.01)

(58) Field of Classification Search
USPC ..................... 60/641.2, 641.4, 641.5; 165/45
See application file for complete search history.

(56) References Cited

U.S. PATENT DOCUMENTS

| | | | |
|---|---|---|---|
| 3,220,470 A | | 11/1965 | Balch |
| 3,274,769 A | * | 9/1966 | Reynolds .................. F03G 7/04 159/902 |
| 3,628,923 A | | 12/1971 | White |
| 3,658,123 A | | 4/1972 | Root |
| 3,786,858 A | * | 1/1974 | Potter ..................... F24D 12/00 165/45 |
| 3,911,683 A | | 10/1975 | Wolf |
| 3,936,652 A | | 2/1976 | Levine |
| 3,954,140 A | | 5/1976 | Hendrick |
| 3,988,896 A | | 11/1976 | Matthews |
| 4,030,549 A | * | 6/1977 | Bouck ................. E21B 43/2401 165/45 |

(Continued)

FOREIGN PATENT DOCUMENTS

| | | |
|---|---|---|
| CN | 1206097 | 1/1999 |
| DE | 102005036472 | 9/2006 |

(Continued)

OTHER PUBLICATIONS

English language abstract for GE1800 (1 page).

(Continued)

*Primary Examiner* — Thomas Denion
*Assistant Examiner* — Mickey France

(57) ABSTRACT

A system and method of maximizing heat transfer at the bottom of a well using heat conductive components and a predictive model are used to design and implement a closed-loop solid state heat extraction system to conduct geothermal heat from rock within the well. A heat conductive material inserted into the well conducts heat to the fluid heat exchanging element. The closed-loop solid state heat extraction system extracts geothermal heat from the well without exposing the rock surrounding the heat nest to a liquid flow.

16 Claims, 4 Drawing Sheets

(56) References Cited

U.S. PATENT DOCUMENTS

| | | | |
|---|---|---|---|
| 4,051,677 A | 10/1977 | Van Huisen | |
| 4,060,988 A * | 12/1977 | Arnold | 60/641.2 |
| 4,094,356 A | 6/1978 | Ash et al. | |
| 4,117,344 A | 9/1978 | Boerstler et al. | |
| 4,255,936 A | 3/1981 | Cochran | |
| 4,277,946 A | 7/1981 | Bottum | |
| 4,286,651 A | 9/1981 | Steiger et al. | |
| 4,314,853 A | 2/1982 | Moens | |
| 4,339,289 A | 7/1982 | Lankard | |
| 4,366,255 A | 12/1982 | Lankard | |
| 4,392,335 A | 7/1983 | Heiman | |
| 4,392,531 A * | 7/1983 | Ippolito | E21B 43/04 165/45 |
| 4,398,842 A | 8/1983 | Hodson | |
| 4,400,259 A | 8/1983 | Schutt | |
| 4,448,043 A | 5/1984 | Aragou | |
| 4,513,040 A | 4/1985 | Lankard | |
| 4,538,673 A | 9/1985 | Partin et al. | |
| 4,588,443 A | 5/1986 | Bache | |
| 4,642,987 A * | 2/1987 | Csorba | F03G 7/04 165/45 |
| 4,668,548 A | 5/1987 | Lankard | |
| 4,714,108 A | 12/1987 | Barry | |
| 4,741,388 A * | 5/1988 | Kuroiwa | F24J 3/083 165/45 |
| 4,780,141 A | 10/1988 | Double et al. | |
| 4,806,168 A | 2/1989 | Ivarsson et al. | |
| 4,854,372 A | 8/1989 | Sakaya et al. | |
| 4,912,941 A * | 4/1990 | Buchi | E21B 33/13 165/45 |
| 4,979,992 A | 12/1990 | Bache | |
| 5,081,848 A | 1/1992 | Rawlings et al. | |
| 5,114,487 A | 5/1992 | Gartshore et al. | |
| 5,272,879 A | 12/1993 | Wiggs | |
| 5,296,187 A | 3/1994 | Hackman | |
| 5,308,572 A | 5/1994 | Hackman | |
| 5,442,906 A | 8/1995 | Broadus | |
| 5,447,564 A | 9/1995 | Xie et al. | |
| 5,497,624 A | 3/1996 | Amir et al. | |
| 5,536,310 A | 7/1996 | Brook et al. | |
| 5,564,282 A | 10/1996 | Kaye | |
| 5,613,452 A | 3/1997 | Marchesi et al. | |
| 5,623,986 A | 4/1997 | Wiggs | |
| 5,626,647 A | 5/1997 | Kohr | |
| 5,816,314 A | 10/1998 | Wiggs et al. | |
| 5,911,897 A * | 6/1999 | Hamilton | 219/497 |
| 6,080,234 A | 6/2000 | Clavaud et al. | |
| 6,251,179 B1 | 6/2001 | Allan | |
| 6,280,521 B1 | 8/2001 | Carter, Jr. | |
| 6,379,031 B1 | 4/2002 | Weingart et al. | |
| 6,502,636 B2 | 1/2003 | Chatterji et al. | |
| 6,503,318 B2 | 1/2003 | Pye et al. | |
| 6,569,235 B2 | 5/2003 | Carter, Jr. | |
| 6,668,573 B1 | 12/2003 | Gilsdorf | |
| 6,694,757 B1 | 2/2004 | Backman | |
| 6,789,608 B1 | 9/2004 | Wiggs | |
| 6,860,936 B2 | 3/2005 | Carter, Jr. | |
| 7,067,004 B2 | 6/2006 | Matula et al. | |
| 7,452,417 B2 | 11/2008 | Matula et al. | |
| 7,578,910 B2 | 8/2009 | Sirola et al. | |
| 7,753,122 B2 | 7/2010 | Curlett | |
| 7,856,839 B2 | 12/2010 | Wiggs | |
| 7,938,904 B1 | 5/2011 | Wiggs | |
| 7,939,154 B2 | 5/2011 | Fosnacht et al. | |
| 8,003,844 B2 | 8/2011 | Dana et al. | |
| 8,246,269 B2 | 8/2012 | Shaw et al. | |
| 2003/0051639 A1* | 3/2003 | Dams et al. | 106/724 |
| 2003/0056936 A1 | 3/2003 | Lindemuth et al. | |
| 2003/0071373 A1 | 4/2003 | Hubbard et al. | |
| 2004/0031585 A1 | 2/2004 | Johnson, Jr. et al. | |
| 2004/0211184 A1 | 10/2004 | Bharathan et al. | |
| 2005/0061472 A1 | 3/2005 | Guynn et al. | |
| 2005/0150225 A1 | 7/2005 | Gwiazda et al. | |
| 2005/0194576 A1 | 9/2005 | Sirola et al. | |
| 2006/0037267 A1 | 2/2006 | Taylor et al. | |
| 2006/0249276 A1* | 11/2006 | Spadafora et al. | 165/45 |
| 2007/0187078 A1 | 8/2007 | Greaney et al. | |
| 2007/0223999 A1 | 9/2007 | Curlett | |
| 2007/0284107 A1 | 12/2007 | Crichlow | |
| 2008/0073248 A1 | 3/2008 | Shah et al. | |
| 2008/0245068 A1 | 10/2008 | Bastawros et al. | |
| 2008/0289334 A1 | 11/2008 | Orosz et al. | |
| 2009/0120090 A1 | 5/2009 | DuBois | |
| 2009/0320475 A1 | 12/2009 | Parrella | |
| 2010/0209666 A1 | 8/2010 | Rivard et al. | |
| 2010/0269501 A1 | 10/2010 | Parrella | |
| 2010/0300092 A1 | 12/2010 | Eli et al. | |
| 2011/0011558 A1 | 1/2011 | Dorrian et al. | |
| 2012/0292816 A1 | 11/2012 | Muratoglu et al. | |

FOREIGN PATENT DOCUMENTS

| | | |
|---|---|---|
| DE | 102005060970 | 6/2007 |
| GE | 1800 | 10/1999 |
| JP | S49-124646 | 11/1974 |
| JP | S57-12571 | 1/1982 |
| JP | 59003178 | 1/1984 |
| JP | S61-79942 | 4/1986 |
| JP | 8284106 | 10/1996 |
| JP | 2001081712 | 3/2001 |
| JP | 2003-148079 | 5/2003 |
| JP | 2004052385 | 2/2004 |
| JP | 2004169985 | 6/2004 |
| JP | 2007177490 | 7/2007 |
| JP | 2008088652 | 4/2008 |
| KR | 1020050034535 | 4/2005 |
| KR | 1020060021023 | 3/2006 |
| RU | 2004889 | 12/1993 |
| RU | 2096696 | 11/1997 |
| RU | 2115868 | 7/1998 |
| RU | 2260751 | 9/2005 |
| SU | 1730439 | 4/1992 |
| SU | 1749497 | 7/1992 |

OTHER PUBLICATIONS

English language abstract for RU2260751 (1 page).
English language abstract for RU2115868 (1 page).
English language abstract for RU2096696 (1 page).
English language abstract for RU2004889 (1 page).
English language abstract for SU1749497 (1 page).
English language abstract for SU1730439 (1 page).
Sanyal, Subir K. and Butler, Steven J., "An Analysis of Power Generation Prospects from Enhanced Geothermal Systems," Proceedings World Geothermal Congress 2005, Antalya, Turkey, Apr. 24-29, 2005 (6 pages).
Rybach, Ladislaus, "Geothermal Sustainability," GHC Bulletin, Sep. 2007 (6 pages).
International Search Report dated Sep. 7, 2012, 1 page.
*Large Titanium Heat Exchangers Design, Manufacture, and Fabrication Issues*, L. Bower, Joseph Oat Corporation, J. Banker, DMC Clad Metal, Corrosion Solutions Conference 2003, Wah Chang, Sep. 2003, 13 pages.
ThermoPEX™, Central Boiler, Inc., 2052 150th Street, Greenbush, MN 56726, Dec. 2005.
*High-Pressure Flexible Pipe, the next frontier*, J. Remery, S. Groves, H. Morand, A. Felix-Henry, D. Percy, J. Day, www.offshore-mag.com, vol. 67, Issue 5, May 2007, 5 pages.
Technip Flexible Pipe, Technologies and products, 12 pages, Dec. 2007.
*Development of a Flexible Pipe for Pipe-in-Pipe Technology*, T. Kagoura, K. Ishii, S. Abe, T. Inoue, T. Hayashi, T. Sakamoto, T. Mochizuki and T. Yamada, Furukawa Review No. 24, 2003, pp. 69-74.
2 pages PCT International Search Report PCT/US2009/004517 date of mailing Apr. 6, 2010.
3 pages PCT International Search Report PCT/US2009/004515 date of mailing Feb. 3, 2010.
4 pages PCT International Search Report PCT/US2009/004518 date of mailing Apr. 6, 2010; including 1st page of Publication WO 2010/016921 A3.

(56) References Cited

OTHER PUBLICATIONS 3 pages PCT International Search Report PCT/US2009/004516 date of mailing Apr. 2, 2010; including 1st page of Publication WO 2010/016920 A3.
JP2004169985 English Language Abstract, Jun. 7, 2004.
KR1020050034535 English Language Abstract, Apr. 14, 2005.
KR1020060021023 English Language Abstract, Mar. 7, 2006.
JP59003178 English Language Abstract, Jan. 9, 1984.
English language abstract of JP2008088652 (2 pages), Apr. 17, 2008.
English language abstract of JP2007177490 (2 pages), Jul. 12, 2007.
English language abstract of JP2004052385 (2 pages), Feb. 19, 2004.
English language abstract of JP2001081712 (2 pages), Mar. 27, 2001.
English language abstract of CN1206097 (1 page), Jan. 27, 1999.
English language abstract of JP8284106 (1 page), Oct. 29, 1996.
International Search Report for PCT/US12/70104, Mar. 21, 2014 (8 pages).
Supplementary European Search Report for EP Application No. 09762945, Mar. 10, 2014 (8 pages).

* cited by examiner

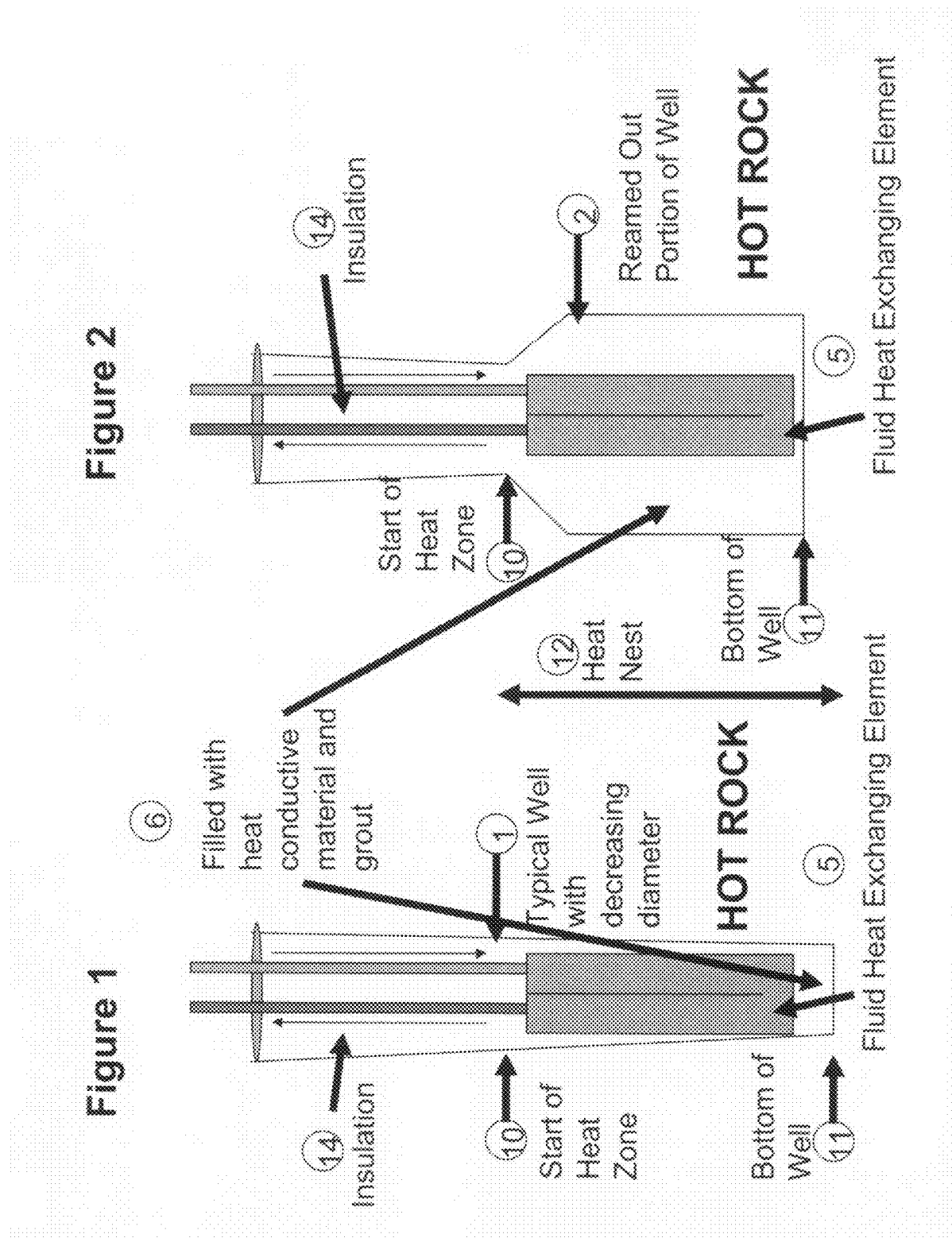

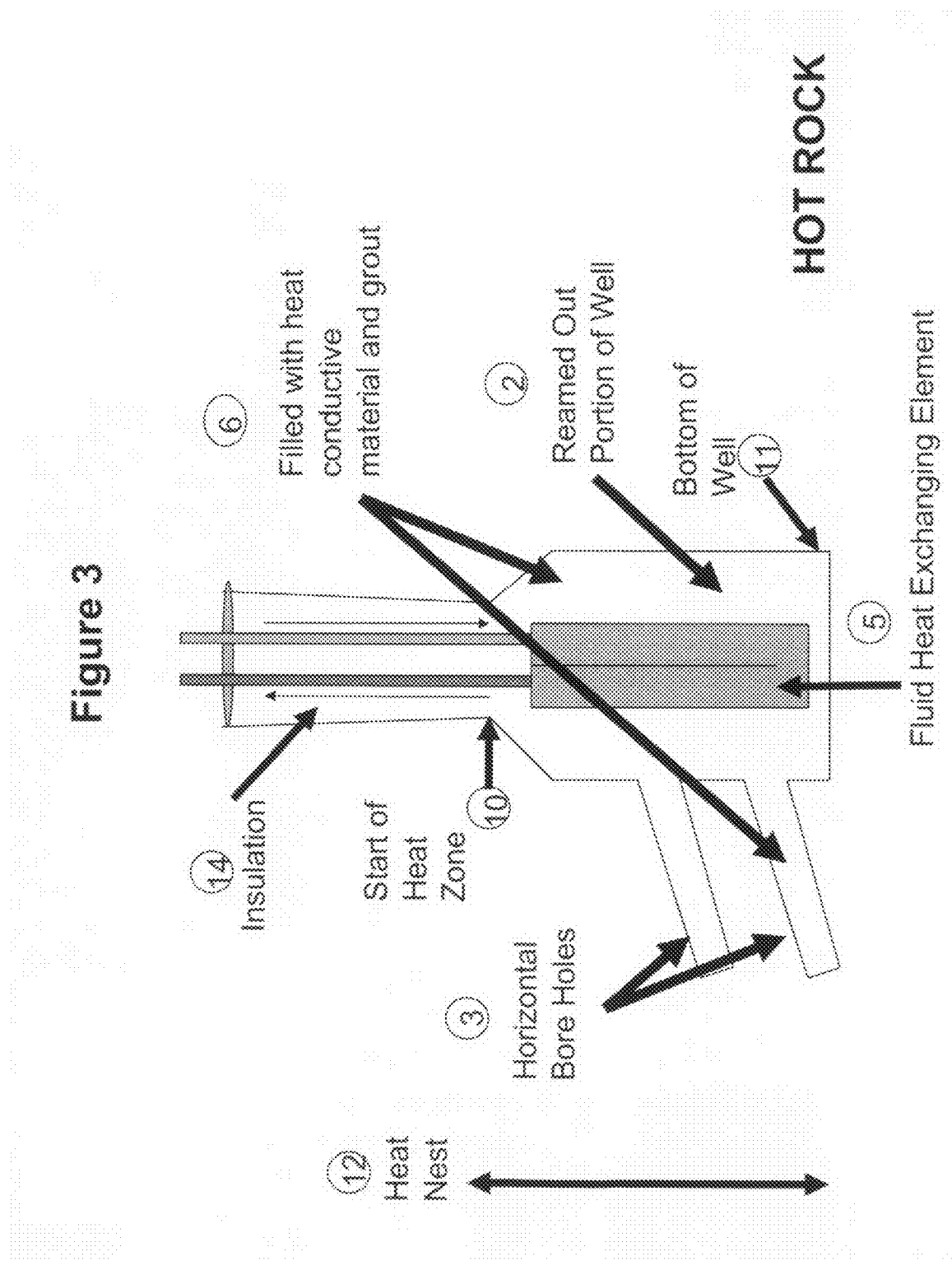

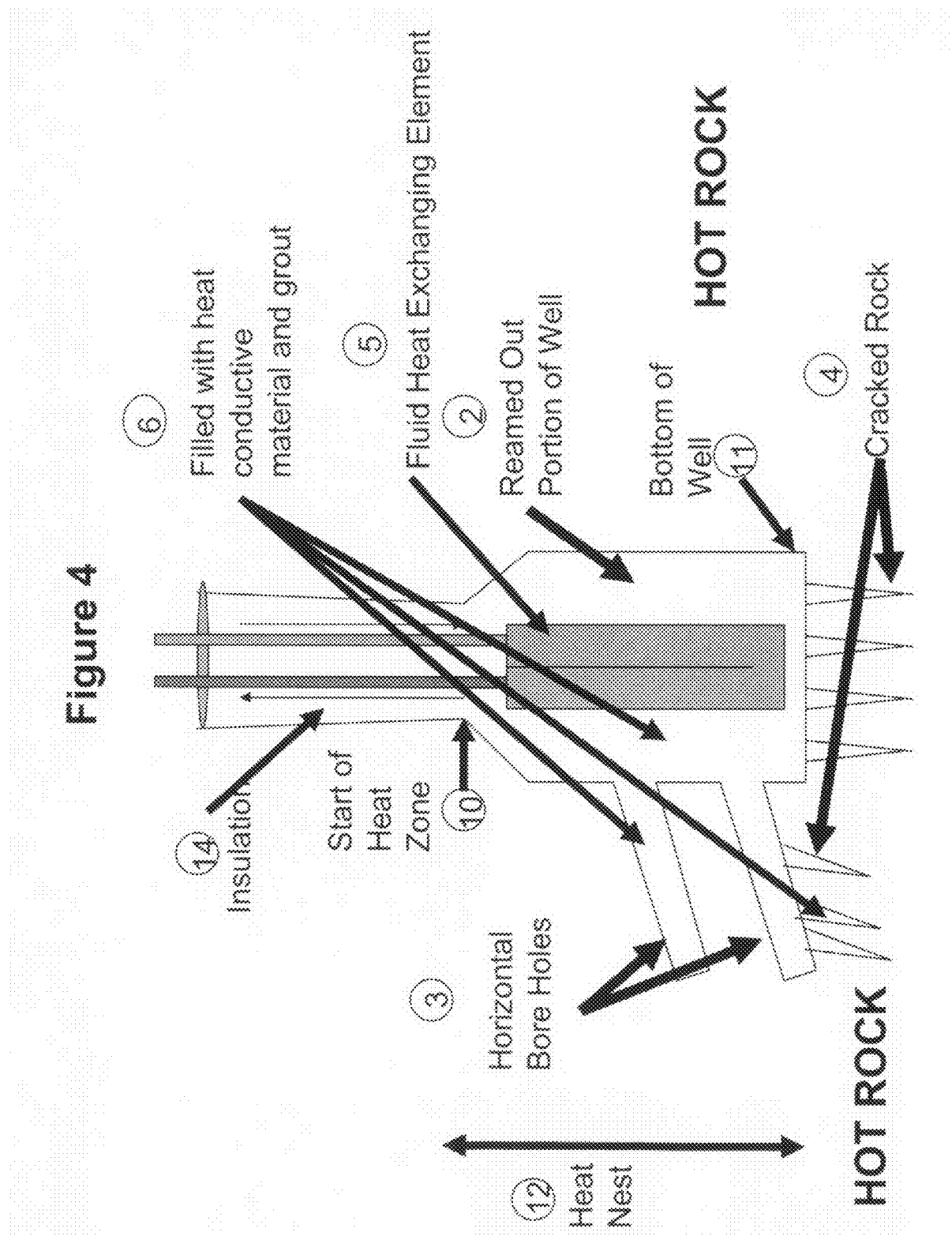

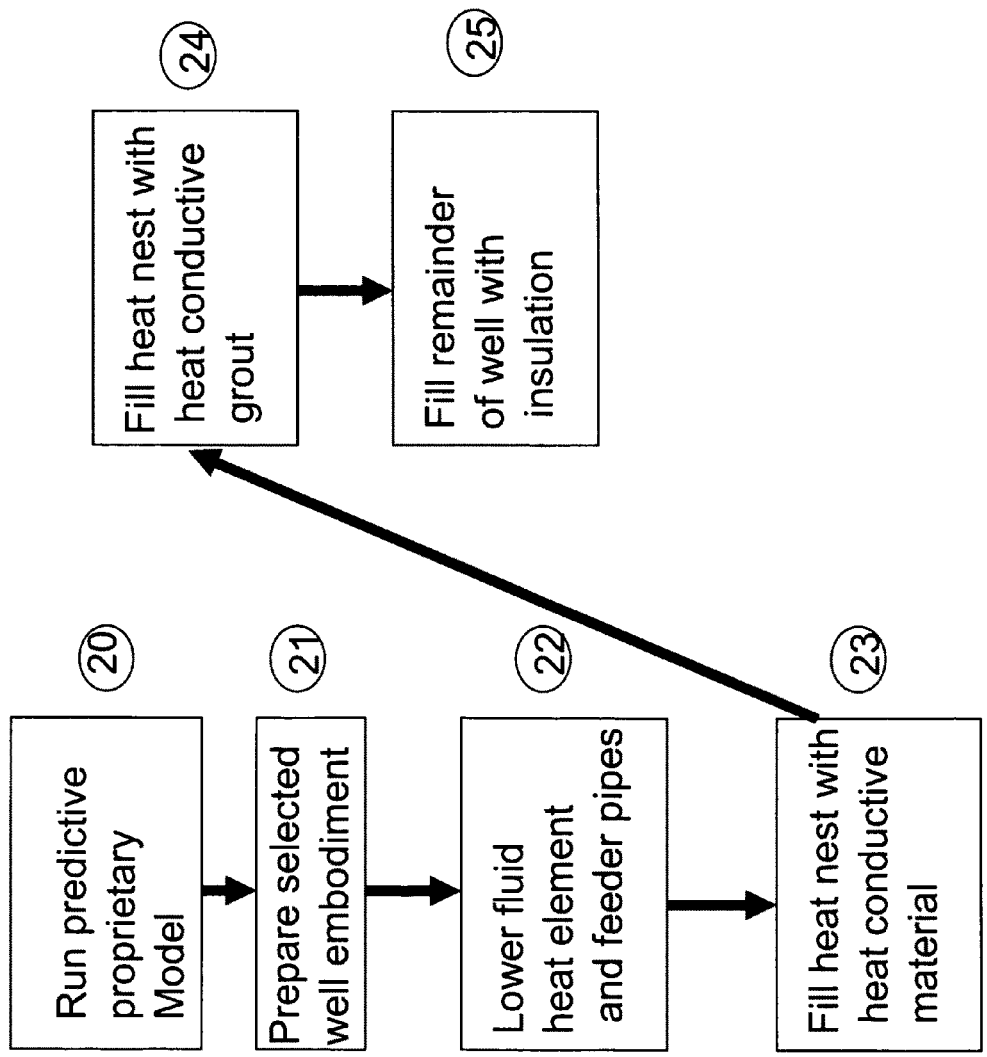

SYSTEM AND METHOD OF MAXIMIZING HEAT TRANSFER AT THE BOTTOM OF A WELL USING HEAT CONDUCTIVE COMPONENTS AND A PREDICTIVE MODEL

CROSS REFERENCE TO RELATED APPLICATIONS

This application is a continuation-in-part of U.S. Non-Provisional patent application Ser. No. 12/456,434 filed on Jun. 15, 2009. This application also claims priority to 1) U.S. Provisional Application No. 61/137,956, filed on Aug. 5, 2008; 2) U.S. Provisional Application No. 61/137,974, filed on Aug. 5, 2008; 3) U.S. Provisional Application No. 61/137,955, filed on Aug. 5, 2008; and 4) U.S. Provisional Application No. 61/137,975, filed on Aug. 5, 2008, the contents of all of which are hereby incorporated in their entirety.

STATEMENT REGARDING FEDERALLY-SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates generally to the field of converting geothermal energy into electricity. More specifically, the present invention relates to capturing geothermal heat from deep within a drilled well and bringing this geothermal heat to the Earth's surface to generate electricity in an environmentally friendly process.

Wells that have been drilled for oil and gas exploration that are either depleted, or have never produced oil or gas, usually remain abandoned and/or unused and may eventually be filled. Such wells were created at a large cost and create an environmental issue when no longer needed for their initial use.

Wells may also be drilled specifically to produce heat. While there are known geothermal heat/electrical methods and systems for using the geothermal heat/energy from deep within a well (in order to produce a heated fluid (liquid or gas) and generate electricity therefrom), these methods have significant environmental drawbacks and are usually inefficient in oil and gas wells due to the depth of such wells.

More specifically, geothermal heat pump (GHP) systems and enhanced geothermal systems (EGS) are well known systems in the prior art for recovering energy from the Earth. In GHP systems, geothermal heat from the Earth is used to heat a fluid, such as water, which is then used for heating and cooling. The fluid, usually water, is actually heated to a point where it is converted into steam in a process called flash steam conversion, which is then used to generate electricity. These systems use existing or man made water reservoirs to carry the heat from deep wells to the surface. The water used for these systems is extremely harmful to the environment, as it is full of minerals, is caustic and can pollute water aquifers. Such deep-well implementations require that a brine reservoir exists or that a reservoir is built by injecting huge quantities of water into an injection well, effectively requiring the use of at least two wells. Both methods require that polluted dirty water is brought to the surface. In the case of EGS systems, water injected into a well permeates the Earth as it travels over rock and other material under the Earth's surface, becoming polluted, caustic, and dangerous.

A water-based system for generating heat from a well presents significant and specific issues. For example, extremely large quantities of water are often injected into a well. This water is heated and flows around the inside of the well to become heated and is then extracted from the well to generate electricity. This water becomes polluted with minerals and other harmful substances, often is very caustic, and causes problems such as seismic instability and disturbance of natural hydrothermal manifestations. Additionally, there is a high potential for pollution of surrounding aquifers. This polluted water causes additional problems, such as depositing minerals and severely scaling pipes.

Geothermal energy is present everywhere beneath the Earth's surface. In general, the temperature of the Earth increases with increasing depth, from 400°-1800° F. at the base of the Earth's crust to an estimated temperature of 6300°-8100° F. at the center of the Earth. However, in order to be useful as a source of energy, it must be accessible to drilled wells. This increases the cost of drilling associated with geothermal systems, and the cost increases with increasing depth.

In a conventional geothermal system, such as for example and enhanced geothermal system (EGS), water or a fluid (a liquid or gas), is pumped into a well using a pump and piping system. The water then travels over hot rock to a production well and the hot, dirty water or fluid is transferred to the surface to generate electricity.

As mentioned earlier herein, the fluid (water) may actually be heated to the point where it is converted into gas/steam. The heated fluid or gas/steam then travels to the surface up and out of the well. When it reaches the surface, the heated water and/or the gas/steam is used to power a thermal engine (electric turbine and generator) which converts the thermal energy from the heated water or gas/steam into electricity.

This type of conventional geothermal system is highly inefficient in very deep wells for several of reasons. First, in order to generate a heated fluid required to efficiently operate several thermal engines (electric turbines and generators), the fluid must be heated to degrees of anywhere between 190° F. and 1000° F. Therefore the fluid must obtain heat from the surrounding hot rock. As it picks up heat it also picks up minerals, salt, and acidity, causing it to very caustic. In order to reach such desired temperatures in areas that lack a shallow-depth geothermal heat source (i.e. in order to heat the fluid to this desired temperature), the well used must be very deep. In this type of prior art system, the geologies that can be used because of the need for large quantities of water are very limited.

The deeper the well, the more challenging it is to implement a water-based system. Moreover, as the well becomes deeper the gas or fluid must travel further to reach the surface, allowing more heat to dissipate. Therefore, using conventional geothermal electricity-generating systems can be highly inefficient because long lengths between the bottom of a well and the surface results in the loss of heat more quickly. This heat loss impacts the efficacy and economics of generating electricity from these types of systems. Even more water is required in such deep wells, making geothermal electricity-generating systems challenging in deep wells.

Accordingly, prior art geothermal systems include a pump, a piping system buried in the ground, an above ground heat transfer device and tremendous quantities of water that circulates through the Earth to pick up heat from the Earth's hot rock. The ground is used as a heat source to heat the circulating water. An important factor in determining the feasibility of such a prior art geothermal system is the depth of wellbore, which affects the drilling costs, the cost of the pipe and the size of the pump. If the wellbore has to be drilled to too great a depth, a water-based geothermal system may not be a practical alternative energy source. Furthermore, these water-based systems often fail due to a lack of permeability of hot rock within the Earth, as water injected into the well never reaches the production well that retrieves the water.

BRIEF SUMMARY OF THE INVENTION

The present invention discloses a geothermal method of harvesting heat energy so it can be turned into electricity. Typically a drilled well's bore diameter reduces in diameter from as much 30 inches on the top to six to eight inches at the bottom of the well. The bottom of the well from the start of the Heat Zone 10 to the Bottom of the Well 11 (Heat Nest) is the target area for extraction of heat. This invention is an approach to maximize the amount of heat that can be transferred form the earth (surface of hot rock) to a heat exchanging element in the Heat Nest 12 by using modelling techniques and proper designs and materials to implement an effective heat extraction system. The heat exchanging Mechanism is a combination of a fluid heat Exchanging Element 5, heat conductive material 6 and heat conductive grout 6 placed in the bottom of a well that has been designed and constructed for heat flow. The heat conductive material and grout conducts the heat from the hot rock surface to the fluid heat exchanging element. The fluid heat exchanging element transfers heat from the heat conducting material and grout to a heat conductive fluid that is flowing through the element. The ratio of temperature and gallons of fluid pumped per minute versus the amount of hot rock surface and the conductivity of the hot rock is critical to creating a system that reaches heat equilibrium, these ratios and the proper implementation of the system needs to be modelled to predict the proper design. Heat equilibrium is the point at which the amount of heat extracted from the bottom of the well is equal to the rate at which the surface of the hot rock is able to replace its heat. A model that helps achieve the proper design of a heat nest 12 that will maximize the value of the heat equilibrium will provide for optimum results. A predictive model that takes into account the design choices and other parameters is used to optimize the performance of the heat extraction.

Wells that have been drilled for oil and gas exploration that are either depleted, or have never produced oil or gas, can now be used to generate electricity. Wells can also be drilled specifically for the purpose of generating electricity. The only requirement is that the wells are deep enough to generate heat from the bottom of the well. The invention is a process for maximizing the heat transfer from the earth (surface of hot rock) to a heat exchanging mechanism at the bottom of a well constructed with a Heat Nest 12. The heat exchanging mechanism is a combination of a fluid heat exchanging element 5, heat conductive material and heat conducting grout 6 properly placed in a well bottom where a Heat Nest has been implemented to exchange heat. The mating and proliferation of the heat conductive material and grout to the surrounding geothermic designed and constructed Heat Nest environment is a fundamental element for the optimization of heat flow. The parametric characteristics (length, width, quantity, heat conductivity, placement, etc) will impact the efficiency of the Heat Nest and the transfer of heat.

The surface of the hot rock exposed in the heat nest is the source of the heat for the generation of power. The hot rock has a capacity to deliver heat that is dependent on its ability to replenish the heat it transfers to the heat conductive material and grout. The heat that can be delivered from the hot rock surface on a continuous basis is the heat equilibrium of the heat nest. The predictive model computes the hot rock surface and the positioning of the creation of the hot rock surface in order to maximize heat flow.

An optimized system uses the proper materials and components in the proper design. The design and components are characterized in a model that will guide the design and implementation. The model can be used for each of the different embodiments described herein. The following chart lists the data used and generated by model, other data inputs and outputs can be added when needed.

| Heat Nest Model | Known |
| --- | --- |
| Width of bore | Yes |
| Width of bore at Heat Nest | Yes |
| Length of Heat Nest | Determined by Model |
| Surface Area of Heat Nest Well Bore | Determined by Model |
| Length of Horizontal bores | Determined by Model |
| Diameter of reamed out portion | Determined by Model |
| Surface Area of Horizontal Bores | Determined by Model |
| Number of Horizontal bores | Determined by Model |
| Surface Area of cracks in strata | Estimate |
| Surface Area of Heat Exchanger | Yes |
| Thermal Conductivity of Strata | Determined by Drilling |
| Thermal Conductivity of Grout & Materials | Determined by Lab |
| Thermal Conductivity of Exchanger fluid | Determined by Lab |
| Feeder Pipe Capacity (GPM) | Yes |
| Transfer efficiency of Heat Exchanger | Determined by Lab |
| Heat loss of Heat Track | Determined by Model |
| Temperature at top of Heat Nest | Determined by Drilling |
| Temperature at bottom of Heat Nest | Determined by Drilling |
| Temperature increase per foot | Determined by Drilling |
| Well Rest Time to maintain Max Output | Determined by Model |

The present invention discloses, generally, a system and method of economically conducting geothermal heat from a well to the Earth's surface and then using this heat to generate electricity in a closed-loop, solid state system. This system and method, known as GTherm, is environmentally responsible because there is no fluid flow from the Earth. It is entirely based on heat flow from rock deep within a well through solid materials to heat contents of pipes pumped in a closed loop from and to the Earth's surface.

The present invention discloses a system for generating electricity using geothermal heat from within a drilled well, comprising a heat harnessing component having a closed-loop solid state heat extraction system. The closed-loop solid state heat extraction system includes a heat exchanging element positioned within a heat nest in a well and a heat conductive material inserted into the well to conduct geothermal heat from the rock surrounding the heat nest to the heat exchanging element. The rock surrounding the heat nest heats the heat conductive material to an equilibrium temperature determined by a surface area of the rock surrounding the heat nest, the equilibrium temperature being a temperature at which the rock surrounding the heat nest and generating the geothermal heat continually recoups the geothermal heat it is conducting to the heat conductive material and above which the geothermal heat generated by the rock surrounding the heat nest dissipates as the heat conductive material conducts heat from the rock surrounding the heat nest to the heat exchanging element. The system also includes an electricity generating component that includes a thermal engine, the electricity generating component receiving geothermal heat from contents of a piping component coupling the heat harnessing component to the electricity generating component, the piping component including a set of downward-flowing pipes and a set of upward-flowing pipes, the upward-flowing pipes conveying contents of the piping component heated by the heat exchanging element to a surface of the well and into the electricity generating component. The system further includes insulation inserted into the well and substantially surrounding at least the upward-flowing pipes at least one position between the heat nest and the surface of the well to maintain a temperature of the contents of the piping system substantially constant as the contents of the piping system are pumped to the surface of the well. The closed-loop, solid state heat extraction system extracts geothermal heat from the well without exposing the rock surrounding the heat nest to a liquid flow.

In another embodiment, the present invention discloses a heat extraction system for generating geothermal heat from within a drilled well. The heat extraction system comprises a heat conductive material injected into an area within a heat nest near a bottom of a drilled well between a heat exchanging element and rock surrounding the heat nest to form a closed-loop, solid state heat exchange to heat contents of a piping system flowing into and out of the heat exchanging element at an equilibrium temperature at which the rock surrounding the heat nest and generating the geothermal heat continually recoups the geothermal heat it is conducting to the heat conductive material and above which the geothermal heat generated by the rock surrounding the heat nest dissipates as the heat conductive material conducts heat from the rock surrounding the heat nest to the heat exchanging element. The heat conductive material solidifies to substantially fill the area within the heat nest to transfer heat from the rock surrounding the heat nest and the heat exchanging element, the piping system bringing the contents of the piping system from a surface of the well into the heat nest and carrying heated contents to the surface of the well from the heat nest. The closed-loop solid state heat extraction system extracts geothermal heat from the well without exposing the rock surrounding the heat nest to a liquid flow.

In another embodiment, the present invention discloses a method of generating electricity using geothermal heat from within a drilled well. The method comprises extracting geothermal heat from rock surrounding a heat nest positioned at a location within a well by injecting a heat conductive material into the heat nest to surround a heat exchanging element to form a closed-loop, solid-state heat extraction system, the heat conductive material exchanging geothermal heat from the rock surrounding the heat nest to the heat exchanging element to heat contents of a piping system, the contents heated within the heat nest at an equilibrium temperature at which the rock surrounding the heat nest and generating the geothermal heat continually recoups the geothermal heat it is exchanging with the heat conductive material and above which the geothermal heat generated by the rock surrounding the heat nest dissipates as the heat conductive material exchanges heat from the rock surrounding the heat nest to the heat exchanging element. The method also comprises insulating the piping system at least one point between the heat nest and the surface of the well to maintain a temperature of the contents of the piping system substantially constant as the contents of the piping system are pumped to the surface of the well. The method further comprises pumping the heated contents of the piping system into an electricity generating component after the heated contents of the piping system reaches the surface of the well. The closed-loop solid state heat extraction system extracts geothermal heat from the well without exposing the rock surrounding the heat nest to a liquid flow.

In still another embodiment, the present invention discloses a method of extracting geothermal heat from within a drilled well. The method comprises determining a type of rock at a depth of a well, a surface area of the rock at the depth of the well, and a heat conductivity factor of the rock at the depth of the well, increasing the surface area of the rock at a desired point in the well between a heat point of the well and a bottom of the well, and forming a heat nest within the well beginning at the bottom of the well and ending at the heat point of the well. The method also includes injecting a heat conductive material between rock surrounding the heat nest and a heat exchanging element within the heat nest to form a closed-loop, solid-state heat extraction system to exchange heat from the rock surrounding the heat nest to the heat exchanging element to heat a contents of a piping system flowing into and out of the heat exchanging element at an equilibrium temperature at which the rock surrounding the heat nest and generating the geothermal heat continually recoups the geothermal heat it is exchanging with the heat conductive material and above which the geothermal heat generated by the rock surrounding the heat nest dissipates as the heat conductive material exchanges heat from the rock surrounding the heat nest to the heat exchanging element. The method further comprises insulating the piping system between the heat nest and a surface of the well. The closed-loop solid state heat extraction system extracts geothermal heat from the well without exposing the rock surrounding the heat nest to a liquid flow.

Other embodiments, features and advantages of the present invention will become more apparent from the following description of the embodiments, taken together with the accompanying several views of the drawings, which illustrate, by way of example, the principles of the invention.

BRIEF DESCRIPTION OF THE SEVERAL VIEWS OF THE DRAWING

FIG. 1 is a conceptual view of a system according to one embodiment of the present invention showing a well with a wider diameter bore hole at the top of the well and decreasing in diameter the deeper the well gets;

FIG. 2 is a conceptual view of a system according to another embodiment of the present invention showing a heat nest implementation where the well is reamed from the start of a heat zone to a bottom of the well;

FIG. 3 is a conceptual view of a system according to another embodiment of the present invention showing a heat nest within a well;

FIG. 4 is a conceptual view of a system according to another embodiment of the present invention showing a heat nest within a well; and FIG. 5 is a flow chart showing steps of a method according to one embodiment of the present invention.

DETAILED DESCRIPTION OF THE INVENTION

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

FIG. 1 illustrates a typical well that starts with a wider diameter bore hole at the top of the well and decreases in diameter the deeper the well gets. In this embodiment the fluid heat exchanging element 5 is designed as a long and thin device. The length of the heat nest 12 creates the hot rock surface for the exchange of heat by the heat exchanging mechanism. The length of the heat nest will be calculated by the model based on supplied data for the materials, components and the desired level of heat extraction.

FIG. 2 illustrates a second preferred embodiment for the heat nest implementation where the well is reamed from the start of heat zone 10 to the bottom of the well 11. This reamed out section along with the heat exchanging mechanism forms the heat nest 12. The reamed out section significantly increases the hot rock surface area. The diameter of the reamed out portion and the length is determined by the model;

FIG. 3 illustrates a third preferred embodiment for the heat nest. By drilling horizontal bore holes 3 from the start of the heat zone to the bottom of the well 11. These horizontal bore holes (drilled at a downward angle of 45 degrees) significantly increases the hot rock surface area thereby increasing the heat at equilibrium. The size, quantity, length and diameter are determined by the model; and FIG. 4 illustrates a fourth preferred embodiment for the heat nest. After the horizontal bore hole are drilled the hot rock is cracked (by hydrofracking or by other means) expanding the hot rock surface area of the heat nest. The amount of cracking is estimated by the model. The target heat zone at the bottom of the well we call the heat nest 12. The heat nest is designed to deliver heat from the surface of hot rock to the fluid heat exchanging element using heat conductive material and grout that occupies the space between the hot rock and the heat exchanging element. This creates a solid state heat exchanging environment. The fluid that flows through the fluid heat exchanging element carries the heat to the surface where the heat is used to create electricity. The well from the start of the heat zone 10 to the top of the well is filled with insulation 14. The insulation prevents heat loss of the fluid that carries the heat to the surface. The fluid can be a gas or a liquid. The model of the Heat Nest is used to guide the selection, design and implementation of all the components. This model will optimize the heat equilibrium and performance of the heat extraction.

In the first embodiment (FIG. 1) once a temperature is reached that establishes the start of the heat nest (the start of the heat zone 10) the length of the heat nest is computed by analysing the amount of hot rock surface that is required to extract the desired heat from the well. The hot rock heat replenishment factor needs to be included in this computation. A model is used to help design and implement the Heat Nest. The length and the replenishment values determine the heat equilibrium of the heat nest. Once the length is determined by the model the well may have to be extended to achieve the required heat nest size. The heat nest is completed by executing the steps in FIG. 5.

In the second embodiment FIG. 2 the heat equilibrium is increased by reaming out the heat nest length from the start of the heat zone to the length required to achieve the desired heat extraction. This will significantly increase the hot rock surface area and increase the heat equilibrium. After the reaming is complete the steps in FIG. 5 are implemented.

In the third embodiment FIG. 3 the heat equilibrium is increased by reaming out the heat nest length from the start of the heat zone to the length required and then drilling additional bore holes at a 45 degree angle to the original well bore. This dramatically increases the size of the heat nest and the amount of hot rock surface area. The number of additional bore holes and their positioning relative to the well bore is determined by modelling the hot rock surface environment and determining what is required to deliver the desired heat extraction rate. By increasing the size and the amount of hot rock surface you raise the heat equilibrium. Before the heat nest is prepared the steps in FIG. 5 are implemented.

In the fourth embodiment FIG. 4 the heat equilibrium is increased by reaming out the heat nest length from the start of the heat zone to the length required and then drilling additional bore holes at a 45 degree angle to the original well bore and then cracking the rock (using hydrofracking or other means). This dramatically increases the size of the heat nest and the amount of hot rock surface area. By increasing the size and the amount of hot rock surface you raise the heat equilibrium. Before the heat nest is prepared the steps in FIG. 5 are implemented.

The heat conductive material used 6 can be metal, plastic, ceramics or any other material that conducts heat well. It can take the form of rods, mesh, foam, particles and balls. The material should be environmentally inert and should resist the caustic environment of the well. In a preferred embodiment the conductive material is in the form of small balls. An example of a material that could be used is steal ball bearings. The balls can be specifically designed for this use. The ball shape is particularly useful for the balls will roll and fill in all the space between the hot rock and the fluid heat conductive exchange element 5. As the balls fill the space 6 they will touch each other and the hot rock and provide a conductive path for the heat. The balls are particularly effective in embodiments 3 and 4 (FIGS. 3 & 4) where there are horizontal bore holes drilled at 45 degree angles. The balls will roll down these bore holes and self install filling the heat nest. In embodiment 4 (FIG. 4) the balls will also fill the cracks in the rock. Using other shapes more difficult installation procedures would be required.

The balls are delivered down to the heat nest by using a liquid filled pipe to control the flow and speed of the balls as they proceed down the well. As the liquid and balls arrive at the heat nest the liquid will evaporate because of the heat (could be turned to steam that escapes up the well) and the balls will then roll into the empty spaces.

Once the balls fill the heat nest the heat conductive gout is delivered in liquid form with a pipe. The grout flows around the balls (or other forms of solid heat conductive material) to fill all the empty spaces. As the grout hardens it creates a solid state heat conductive mechanism in the heat nest. The grout has been prepared to counteract the caustic environment of the well. If the environment of the heat nest is acidic the grout is prepared as an alkaline mixture to counter act the acidic environment. If the environment of the heat nest is alkaline the grout is prepared with an acidic mixture to counter act the alkaline environment.

The size of the balls and the materials used determine the heat conductivity of the heat exchange mechanism. The predictive model will compute the amount of heat that can be extracted based on the supplied data and materials.

Once the grout hardens the well bore from the grout to the surface is filled with insulation. This reduces heat loss from the well bottom to the electric generation equipment. Examples of insulation that can be used are "Therm-O-Case" and "Therm-O-Trol" manufactured by General Electric for use in the oil industry.

Crude oil moving through 800 miles trans-Alaska pipeline must be kept at relatively high temperature approximately 180 degrees Fahrenheit to maintain fluidity of oil in arctic weather. GE provided a product called Therm-O-Trol which is metal bonded polyurethane foam especially formulated for arctic insulation. Another problem was solved using Therm-O-Case which is a double walled oil well casing with multilayered insulation which provides a protective barrier against heat transfer. Evolving from Gemini and Apollo, this product solved problem involving bringing in hot crude oil from 2,000 foot deep wells to surface without transferring oil heat to the surrounding permafrost soil; heat transfer could melt the frozen terrain and cause dislocation that might destroy expensive well casings.

A second preferred embodiment is the use of a highly conductive foam that can be pumped into the space between the hot rock and the fluid heat conductive exchange element 5. This foam can be pumped done into the heat nest space with a pipe. Once the foam has been piped into the space and hardens it can be capped with the heat conductive grout and then insulation can be installed between the grout cap and the top of the well.

Carbon foams were first developed by researchers in the late 60's as a reticulated vitreous (glassy) carbon foam. Ford (1) reported on carbon foams produced by carbonizing thermosetting organic polymer foams through a simple heat treatment. Then, Googin et al. 2 at the Oak Ridge Atomic Energy Commission Laboratory reported the first process dedicated to controlling the structure and material properties of carbon and graphitic foams by varying the precursor material (partially cured urethane polymer). In the several decades following these initial discoveries, many researchers explored a variety of applications for these materials ranging from electrodes to insulating liners for temperatures up to 2500° C. In fact, reticulated carbon foams have been used as the template for many of the metal and ceramic foams currently used in industry. In the 1970's, research focused primarily on producing carbon foams from alternative precursors. For example, Klett, R. (6) at the Sandia National Laboratories produced the first carbon foams from cork, a natural cellular precursor. Others worked on various processing and precursor changes in an attempt to modify properties and reduce cost. The majority of these carbon foams were used for thermal insulation, although some structural applications were found.

In the early 1990's, researchers at the Wright Patterson Air Force Base Materials Lab pioneered mesophase-derived graphitic foams, specifically for replacing expensive 3-D woven fiber performs in polymer composites and as replacements for honeycomb materials. Their work was centered on developing a highly structural material that was lightweight, and to date, exhibits the highest specific strength of carbon foams. Concurrently, Ultramet Corp, performed research on RVC foam and used chemical vapor deposition (CVD) as a technique to place pyrolytic graphite on the glassy carbon ligaments of RVC, producing 3-D carbon structures with high-modulus ligaments.

With the goal of producing very inexpensive carbon foams, researchers at West Virginia University developed a method that used coal as a precursor for high strength foams with excellent thermal insulation properties. In 1997, Klett, J. at the Oak Ridge National Laboratory (ORNL) reported the first graphitic foams with bulk thermal conductivities greater than 40 W/m·K (recently, conductivities up to 180 W/m·K have been measured). By combining an open cellular structure with a thermal conductivity to weight ratio of greater than 200 (compared to 45 for copper), this material presents a unique opportunity to radically change the approach to solving many heat transfer problems. This graphite material has been examined for the core of heat transfer devices such as radiators and heat sinks, evaporative cooling and phase change devices. Furthermore, the ability of the graphite foam to intercalate lithium and absorb acoustic energy makes them candidates for several applications beyond thermal management. The following table outlines the thermal capacity of the foam.

| ORNL Graphite Foam Experimental Properties | | | | | |
|---|---|---|---|---|---|
| | ORNL Foam I | ORNL Foam II | ORNL Foam III | Aluminum 6061 | |
| Physical Properties | | | | | |
| Density | 0.57 | 0.59 | 0.70 | 2.88 | g/cm$^3$ |
| Porosity | 0.75 | 0.74 | 0.69 | 0 | |
| Fraction Open Porosity | 0.98 | 0.98 | n.m. | 0 | |
| Average Cell Size | 350 | 60 | 350-400 | — | microns |
| Coefficient of Thermal Expansion | 0-1 (z) 1-3 (x-y) | n.m. | n.m. | 17 | ppm/° C. |
| Max Operating Temperature in Air | 500 | 500 | 500 | 600 | ° C. |
| Mechanical Properties | | | | | |
| Tensile Strength | 0.7 | n.m. | n.m. | 180 | MPa |
| Compressive Strength | 2.1 | 5.0 | 5.1 | — | MPa |
| Compressive Modulus | 0.144 | 0.180 | 1.5 | 70 | GPa |
| Thermal Properties | | | | | |
| Bulk Thermal Diffusivity | 4.53 | 3.1 | 3.52 | 0.81 | cm$^2$/s |
| Bulk Thermal Conductivity | 175 | 134 | 170 | 180 | W/m · K |
| Specific Heat Capacity | 691 | 691 | 691 | 890 | J/Kg · K |

It is to be understood that other embodiments may be utilized and structural and functional changes be made without departing from the scope of the present invention. The foregoing descriptions of the embodiments of the invention have been presented for the purposes of illustration and description. It is not intended to be exhaustive or to limit the invention to the precise forms disclosed. Accordingly, many modifications and variations are possible in light of the above teachings. It is therefore intended that the scope of the invention not be limited by this detailed description.

The invention claimed is:
1. A system comprising:
a bore hole of a well;
a heat nest positioned in the bore hole, the heat nest including additional drilled horizontal bore holes at about a 45 degree angle in relation to the bore hole of the well to substantially increase the size of the heat nest and the amount of hot rock surface area;

a closed-loop solid state heat extraction system having a fluid heat exchanger positioned within the heat nest;

a heat conductive material inserted into the well to conduct geothermal heat from rock surrounding the heat nest to the fluid heat exchanger;

a heat conductive grout that fills the heat nest and surrounds the heat conductive material completing the closed-loop solid state heat extraction system;

a set of downward-flowing pipes and a set of upward-flowing pipes, the set of downward-flowing pipes configured to couple to the fluid heat exchanger for conveying contents to the fluid heat exchanger for heating, and the upward-flowing pipes also configured to couple to the fluid heat exchanger for conveying heated contents from the fluid heat exchanger to a surface of the well from the heat nest; and insulation inserted into the well and substantially surrounding at least the upward-flowing pipes in at least one position between the heat nest and the surface of the well to maintain a temperature of the contents of the piping system substantially constant as the contents of the piping system are pumped to the surface of the well, wherein the rock surrounding the heat nest heats the heat conductive material to an equilibrium temperature determined by a surface area of the rock surrounding the heat nest, the equilibrium temperature being a temperature at which the rock surrounding the heat nest and generating the geothermal heat continually recoups the geothermal heat conducted to the heat conductive material and above which the geothermal heat generated by the rock surrounding the heat nest dissipates as the heat conductive material conducts heat from the rock surrounding the heat nest to the fluid heat exchanger, and the closed-loop solid state heat extraction system extracts geothermal heat from the well without exposing the rock surrounding the heat nest to a liquid flow.

2. The system of claim 1, wherein the closed-loop solid state heat extraction system and the heat nest are designed using predictive modeling that will maximize the value of a heat equilibrium, and that is based at least partly on determining a ratio of temperature and gallons of fluid pumped per minute versus the amount of hot rock surface and the conductivity of the hot rock for creating the closed-loop solid state heat extraction system that reaches heat equilibrium.

3. The system of claim 2, wherein the predictive modeling is based at least partly on using or generating data for various parameters related to a heat nest model for the closed-loop solid state heat extraction system, comprising:
known data including:
the width of the well,
the width of the bore hole at the heat nest,
the surface area of the fluid heat exchanger, and
a feeder pipe capacity (GPM), all known based on the closed-loop solid state heat extraction system to be configured;
drilling determined data, including:
the thermal conductivity of strata,
the temperature at the top of the heat nest,
the temperature at the bottom of the heat nest, and
the temperature increase per foot, all sensed using sensing equipment once the closed-loop solid state heat extraction system is partly drilled;
lab determined data, including:
the thermal conductivity of grout and materials,
the thermal conductivity of an exchanger fluid, and
the transfer efficiency of the fluid heat exchanger, all determined using known testing methodology in a lab;
estimated data, including
the surface area of cracks in the strata, as estimated; and
predictive model determined data, including:
the length of the heat nest,
the surface area of a heat nest well bore,
the length of horizontal bores,
the diameter of a reamed out portion of the bore hole,
the surface area of horizontal bores,
the number of horizontal bores,
the heat loss of a heat track, and
the well rest time to maintain max output,
wherein the used and generated data for the heat nest model are processed in order to help predict a closed-loop solid state heat extraction system configuration that satisfies a given well design, for determining the ratio of temperature and gallons of fluid pumped per minute versus the amount of hot rock surface and the conductivity of the hot rock for creating the closed loop system that reaches heat equilibrium.

4. The system of claim 3, wherein the equilibrium temperature is attained by implementing a well bore hole that is drilled long enough to reach a hot rock surface adequate to establish a desired heat equilibrium, including where the predictive modeling determines the length of the bore hole to maximize the heat extraction.

5. The system of claim 4, wherein the number of additional drilled horizontal bore holes and the diameter, length and positioning of each additional drilled horizontal bore hole are determined by the predictive modeling used to help optimize the heat extraction.

6. The system of claim 5, wherein the heat nest has a reamed out portion that is reamed out of the bore hole from a start of a heat zone to the bottom of the well to significantly increase the hot rock surface area and increase the heat equilibrium, including where the reamed out portion is defined by the predictive modeling used to help maximize the heat extraction.

7. The system of claim 6, wherein the hot rock surface area is cracked to increase the surface area of the hot rock, including where the predictive modeling is used to help indicate an amount of cracking required to maximize the heat extraction.

8. The system of claim 7, wherein the system further comprises at least one additional material injected into the heat nest, wherein the at least one additional material is at least one heat conductive ball having a size and heat conductive characteristics determined by the predictive modeling used to help optimize the heat extraction.

9. The system of claim 8, wherein the system further comprises at least one additional material injected into the heat nest, including where the at least one additional material is at least one heat conductive bead.

10. The system of claim 8, wherein the system further comprises at least one additional material injected into the heat nest, including where the at least one additional material is a heat conductive meshed metallic material.

11. The system of claim 8, wherein the system further comprises at least one additional material injected into the heat nest, including where the at least one additional material is a plastic material.

12. The system of claim 8, wherein the system further comprises at least one additional material injected into the heat nest, including where the at least one additional material is a heat conducting rod.

13. The system of claim 8, wherein the system further comprises at least one additional material injected into the heat nest, the at least one additional material being a heat conducting carbon or graphite foam.

14. The system of claim 8, wherein the heat conductive grout is pumped into the heat nest as a liquid to fill the spaces around the heat conductive material, wherein the grout hardens in the spaces when dry.

15. The system of claim 8, wherein the heat conductive grout is treated to counteract the caustic nature of the well bore, the grout being adjusted to be alkaline if the environment of the well bore is acidic, and the grout being adjusted to be acidic if the well bore is alkaline.

16. The system of claim 1, wherein a heat equilibrium is based at least partly on a point at which the amount of heat extracted from the bottom of the well is equal to the rate at which the surface of the hot rock is able to replace its heat.

* * * * *